Dec. 2, 1941.  R. C. HAWKINS  2,264,527
BRICK TRUCK
Filed July 27, 1940
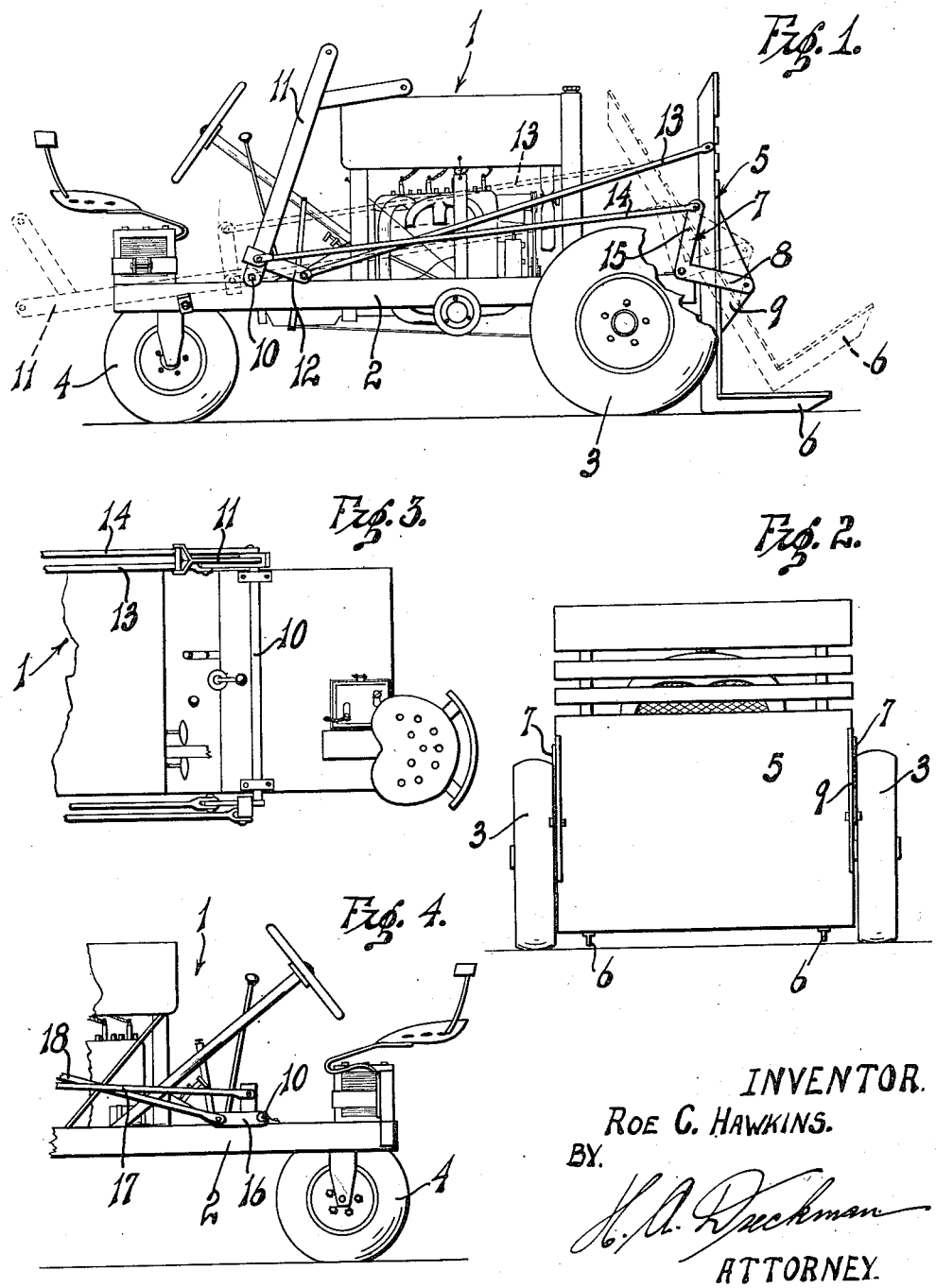
INVENTOR.
ROE C. HAWKINS.
BY
ATTORNEY.

Patented Dec. 2, 1941

2,264,527

UNITED STATES PATENT OFFICE 2,264,527

BRICK TRUCK

Roe C. Hawkins, Long Beach, Calif.

Application July 27, 1940, Serial No. 347,990

2 Claims. (Cl. 214—65.2)

This invention relates to a brick truck, whereby bricks are transported to the kiln after they have been cut and stacked on a flat board, all of which is usual procedure in the manufacture of brick. The bricks are stacked four or five feet high on a flat board and are thus transported to the kiln for firing, and it is evident that the brick must be carefully handled while being transported, and in picking the bricks up and afterwards setting them down in position.

An object of my invention is to provide a novel brick truck, which is provided with manually operable means to extend under the supporting tray or platform of the bricks, and then first raise this platform clear of the ground and afterwards tilt the stack of bricks slightly so that they can be effectively transported.

A feature of my invention resides in the novel means of operating the supporting front plate of the truck so that the stack of bricks are first lifted clear of the ground before the stack is tilted slightly to the rear, which is the position of transportation.

Another object is to provide a novel brick truck of the character stated, which is simple in construction, relatively inexpensive to manufacture, and which will effectively and quickly transport stacks of brick from one point to another.

Other objects, advantages and features of invention may appear from the accompanying drawing, the subjoined detailed description, and the appended claims.

In the drawing—

Figure 1 is a side elevation of my brick truck, with parts broken away to show inner construction.

Figure 2 is a front elevation of the brick truck.

Figure 3 is a fragmentary, plan view showing the rear part of the truck.

Figure 4 is a fragmentary, side elevation of the rear part of the truck, showing the side opposite to that viewed in Figure 1.

Referring more particularly to the drawing, the numeral 1 indicates a motor driven tractor, which includes a frame or chassis 2. A pair of forward wheels 3 are driven by the motor, and the truck is steered by the rear caster wheel 4. The operator sits at the rear of the truck and steers the vehicle, as well as handles the brick lifting means, as will be evident from the subsequent description.

A flat plate 5 is mounted at the forward end of the truck 1, and extends substantially the full width of the truck. A pair of fingers 6 extend forwardly from the plate 5, and these fingers extend under the plate upon which the bricks are stacked. A bell crank lever 7 is pivotally mounted on each side of the truck, and these levers are pivotally attached to the forward end of the frame 2. The lower arm 8 of the bell crank 7 is pivotally attached to a web 9, which projects forwardly from the plate 5. The bell crank 7 will be termed the lifting bell crank. When the bell crank 7 is swung on its pivot, the plate 5 will be lifted substantially vertically, and after the plate 5 is clear of the ground, it is then tilted rearwardly to the position shown in dotted lines in Figure 1, and as will be subsequently described.

A shaft 10 is journaled on the chassis 2 and extends transversely of the truck. This shaft is positioned forwardly of the operator of the vehicle, and at one end of this shaft an operating lever 11 is fixedly attached. An arm 12 extends from the operating lever 11, and is arranged above the shaft 10. This arm may be an integral part of the lever 11 or it may be fixedly attached thereto. A link 13 is pivotally attached to the outer end of the arm 12, and the other end of the link is pivotally attached to the plate 5. The attachment of the link 13 to the plate 5 is materially above the bell crank 7 so that the plate 5 will be first lifted vertically without any appreciable rearward tilt, and then on further movement of the lever 11, the plate will be tilted to the position shown in dotted lines in Figure 1. A second link 14 is pivotally attached at one end to the lever 11, this pivotal attachment being substantially on the longitudinally center line of the lever. The outer end of the link is pivotally attached to the upwardly extending arm 15 of the bell crank 7.

From an examination of Figure 1, it will be evident that as the operating lever 11 is swung rearwardly, the pivotal connection of the link 14 on the lever is on the arc of small radius, whereas the pivotal connection of the link 13 is on a larger radius. This arrangement of parts further aids in the proper movement of the supporting plate 5, namely, first, a vertical movement to lift this plate above the ground, and then a rearward tilting movement to transport the bricks. A second arrangement of links is provided on the other side of the truck, opposite the operating lever 11, and consists of a bell crank fixedly attached to the shaft 10. An operating link 17 is pivotally attached to the short arm of this bell crank and to the corresponding bell crank 7 at the front of the truck. A second tilting link 18 is pivotally attached to the longer arm of the bell crank 16 and at its forward end to the plate 5 for the purpose of tilting this plate in the manner previously described.

By providing links on both sides of the truck, the plate 5 will be properly moved without distortion, and there will be less strain on the operating parts. It will be noted that when the operating lever 11 is swung rearwardly, as shown in dotted lines in Figure 1, the link 14 is so positioned that tension on the link due to the load on the plate 5 will not automatically swing the lever 11 upwardly to permit the plate 5 to move into vertical position—that is, the parts are locked against accidental movement, and the operator must manually swing the lever upwardly in order to again tilt the plate 5 into vertical position and discharge the load of bricks.

Having described my invention, I claim:

1. In a brick truck including a frame, a transverse plate positioned forwardly of the truck, supporting fingers on the plate extending forwardly, a bell crank pivotally mounted on the frame on each side thereof, one arm of the bell crank being pivotally attached to the plate, a drag link pivotally attached to the other arm of the bell crank, a second drag link pivotally attached to the plate, an actuating means, both of said drag links being pivotally secured to the actuating means, said actuating means including a hand lever, means pivotally mounting the hand lever on the frame, an arm extending from the hand lever, the second drag link being pivotally attached to said arm, and the first drag link being pivotally attached to the hand lever.

2. In a brick truck including a frame, a plate arranged at the front of the truck, supporting fingers extending forwardly from the plate at the lower end thereof, a pair of bell cranks pivotally mounted on each side of the frame, a forwardly extending web on each side of the plate, one arm of the bell crank being pivotally secured to the web, a drag link pivotally connected to the other arm of each bell crank, a second drag link on each side of the truck, said second drag link being pivotally secured to the plate above the bell crank, a shaft journaled on the truck frame, a hand lever on one end of the shaft, an arm extending from the hand lever, one of the first-named links being pivotally secured to the hand lever, one of the second links being pivotally attached to the outer end of the arm, a bell crank on the other end of the shaft, the second pair of drag links being each pivotally attached to one of the arms of the last-named bell crank.

ROE C. HAWKINS.